United States Patent Office 3,698,891
Patented Oct. 17, 1972

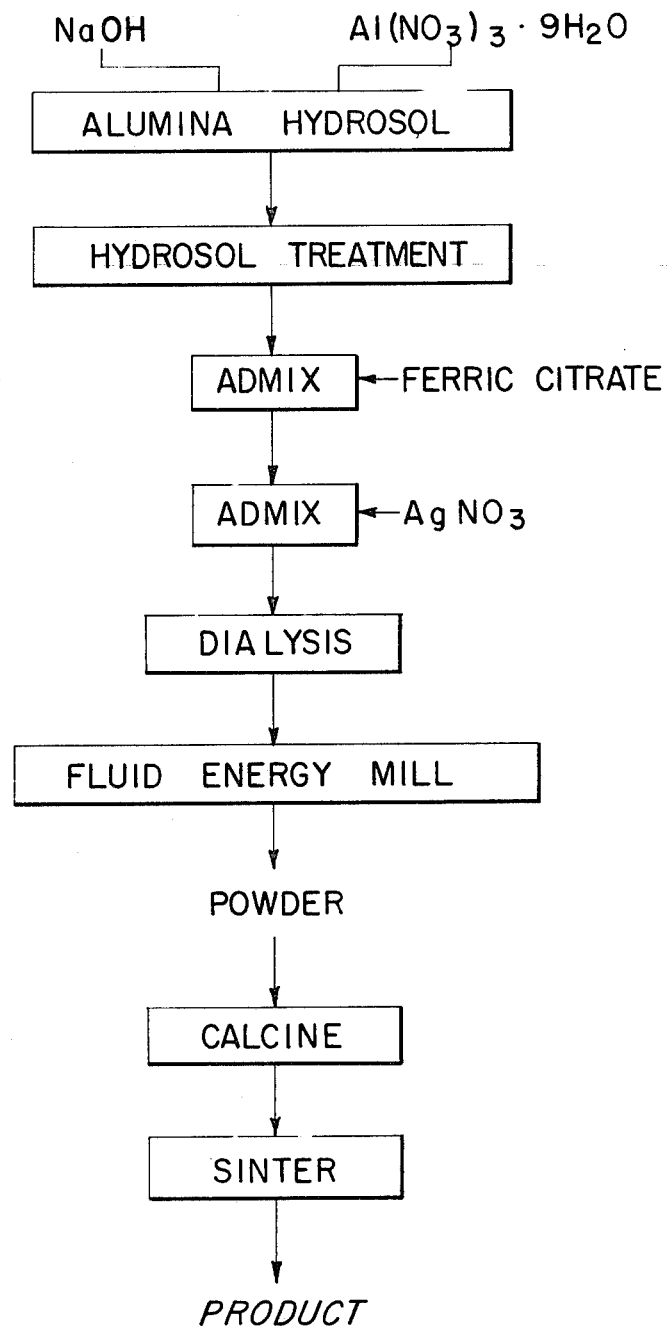

3,698,891
METHOD FOR THE PREPARATION OF ALUMINA SILVER COMPOSITES
Arvind S. Patil, Silver Spring, and George E. Ashby, Highland, Md., assignors to W. R. Grace & Co., New York, N.Y.
Filed Sept. 5, 1969, Ser. No. 855,709
Int. Cl. B22f 1/00
U.S. Cl. 75—206     7 Claims

ABSTRACT OF THE DISCLOSURE

Alumina ceramics containing more than one percent silver are prepared by sequentially treating an alumina hydrosol with a reducing agent and a silver salt, or vice versa. The material is treated in a fluid energy mill which is operated at a high temperature. The material is then calcined and sintered. The silver containing alumina of this invention are useful as ablative compositions.

BACKGROUND OF THE INVENTION

(1) Objectives of this invention

An object of this invention is to prepare alumina containing large amounts of silver. Another object of this invention is to prepare such silver containing alumina without appreciably reducing the structural strength of the alumina. Other objects will be apparent to those skilled in the art from the following specification, drawing, and claims.

(2) Prior art

The inclusion of metallic silver onto alumina has been hampered by the volatile nature of the metallic silver at the sinter temperatures of alumina, namely, 1800° C. to 1900° C. Less than one percent of the silver can be retained during the sintering step.

U.S. Pat. No. 3,369,877 discloses a fine grained sintered compact of finely divided metallic tungsten or molybdenum dispersed in aluminum oxide. Several methods of introducing Mo into $Al_2O_3$ are given. In each case Mo or $MoO_3$ (then reduced) is introduced into $Al_2O_3$, but the $Al_2O_3$ was not produced from an aluminum salt which had been subjected to processing in a fluid energy mill operated at high temperatures.

It is known that tungsten and other refractory metals which are impregnated with silver can be used as an ablative material. See p. 20 of Ungar, E. W., "Ablative Materials for Reentry Systems," Am. Inst. of Ch. E., New York, N.Y., Preprint 13B (1968), Materials Conference.

BOARD DESCRIPTION OF THE INVENTION

This invention involves a process for preparing silver containing alumina, where the composition preferably contains greater than one percent by weight silver. The process includes preparing an alumina hydrosol (sol) and admixing, sequentially, a reducing agent and a silver salt, or vice versa. The mixture may be dialyzed.

The alumina hydrosol (containing thereon precipitated silver) is treated in a fluid energy mill. The exit temperature of the material exiting from the fluid energy mill is between about 425° C. and about 680° C. The resultant powder is useful as a material from which to obtain an ablative composition. The resultant powder is collected, and calcined at a temperature between about 800° C. and about 1000° C. for at least one hour (and preferably for between 2 hours and 3 hours). The calcined material is useful as a powder for preparation of ductile cermet upon sintering. The calcined material is then sintered at a temperature of at least 1400° C. (and preferably between about 1400° C. and about 1500° C.). The sintering is conducted for at least one hour (and preferably for between 2 hours and 3 hours). Also, the sintering is done preferably under a positive silver vapor pressure. A dense ceramic body containing silver is obtained which is useful as an ablative composition. The alumina hydrosol can, optionally, be centrifuged and dialyzed before it is treated in the fluid energy mill. Alumina powder can be used in place of the alumina hydrosol, and may be calcined before usage.

This invention allows (1) preparation of alumina ceramics containing silver in greater amounts than is possible by the infiltration of silver in gas phase during during the sintering; and (2) preparation of dispersion hardened silver containing alumina as a disperse phase and where the particle growth of the alumina is prevented by depositing silver on it.

This invention also includes the ablative composition, dispersion hardened materials and ductile cermets produced by the novel process of this invention.

DETAILED DESCRIPTION OF THE INVENTION

The preferred embodiment of this invention is disclosed in the drawing and the description thereof below. In the drawing:

The figure is a schematic diagram of the process of this invention.

As shown in the figure, an alumina hydrosol is prepared and treated. The hydrosol is admixed with ferric citrate solution and then $AgNo_3$ solution, is added dropwise. The admixture is dialyzed. The admixture is treated in a fluid energy mill. The resultant powder is calcined and then sintered, under positive silver vapor pressure, to produce a silver containing alumina ceramic.

Within the scope of this invention, the term "solutions" encompasses solutions, suspensions, dispersions, slurries, slightly thixotropic solutions, fluidized mixtures, etc. Also, the term "powders" encompasses powders, fine powders, etc.

Aluminum salts which may be employed in preparing the alumina sol are preferably those soluble in water. Suitable aluminum salts include both inorganic and organic acids, such as: aluminum thiocyanate; aluminum-ammonium chloride; aluminum bromide; ammonium alum; aluminum citrate; aluminum diformate; aluminum oleate; aluminum phosphate; aluminum salicylate; basic aluminum acetate; aluminum fluoride; aluminum isopropylate; aluminum nitrate; aluminum stearate; aluminum triformate; aluminum sulfate; etc. Mixtures of the aluminum salts can be used. Aluminum nitrate is particularly preferred. The use of an alumina hydrosol is preferred.

In general, the alumina hydrosols can be prepared and purified by conventional means known to the art.

Silver salts which may be admixed with the alumina sols are preferably those soluble in water. Suitable silver salts include salts of both inorganic and organic acids, such as the nitrate, acetate, sulfate, picrate, benzoate, fluoride, etc. Silver nitrate is particularly preferred owing to its solubility and availability. Examples of silver compounds (essentially water insoluble) that are soluble in solvents other than water are: silver bromate; silver bromide; silver chloride; silver chromate; silver cyanide; silver dichromate; silver iodate; silver iodide; silver lactate; silver phosphate; silver sulfide; etc. Mixtures of the silver salts can be used.

Reducing agents which can be admixed with the alumina sols include such materials as ferric citrate, formaldehyde, etc.

Water is the preferred solvent, but when aluminum and silver salts are used which are essentially insoluble or poorly soluble in water, other solvents can be used. The non-aqueous solvents must evaporate off at the high temperatures used in the fluid energy mill; be non-reactive with the solution components; preferably be non-toxic to man; etc. Examples of other non-aqueous solvents are nitric acid; acetic acid; ethanol; methanol; ammonium hydroxide; ether; acetone; sodium thiosulfate; potassium thiosulfate; propanol; glycerol; ammonium carbonate; chloroform; sulfuric acid; isopropanol; glycerine; carbon disulfide; benzene; turpentine; etc. Mixtures of the above solvents, including water, can be used.

After admixture with the reducing agent and the silver salt, the material is dialyzed. Dialysis is a membrane transport process in which solute molecules are exchanged between two liquids. In dialysis, the membrane separating the liquids permits diffusional exchange between at least some of the molecular species present while effectively preventing any corrective exchange between the solutions. In this invention, dialysis is used for separating truly dissolved substances from those in colloidal suspension in water or other fluid. This is possible because the smaller molecules or ions of the dissolved substances diffuse through parchment membranes, or other semipermeable membranes, while the relatively large molecular aggregates of colloidal substances pass through only very slowly.

A crucial factor of this invention is the use of a fluid energy mill at a high temperature. Normally in the operation of a fluid energy mill, gas of a high energy content is introduced into a pulverizing chamber. Feed materials in the chamber are caused to impinge upon themselves at high velocities while entrained in the gas stream, causing a reduction in particle size. Two common types of fluid energy mills are the micronizer and the jet pulverizer. This jet pulverizer is the preferred type of fluid energy mill, particularly one where the fluid media is utilized at supersonic velocities. U.S. Pat. No. 3,186,648 describes a typical jet pulverizer and is incorporated herein for that purpose. These mills are operated by steam, gas or compressed air. In this invention the fluid media and injection media are preferably high pressure-high temperature steam (the former, when the mill allows, at higher levels). In this invention the media normally termed the grinding media is termed the fluid media and essentially no grinding occurs (the rapid evaporation and thermal decomposition keeps the particle size extremely small and there is no particle agglomeration and crystal growth as in conventional drying schemes). The solvent used in the solution of particles to be reduced in size is evaporated off during the fluid energy mill operation. There is extensive thermal decomposition during the mill operation.

The calcining step is conducted at a temperature between 800° C. and 1000° C. for at least one hour (and preferably for between 2 hours and 3 hours.) Most preferably, the calcining step is done at about 900° C. for about 2 hours. As is normal in calcining-sintering operations, the calcined material is pressed to increase its density between the calcining and sintering steps, or during the sintering step.

The sintering step is conducted at a temperature of at least 1400° C. (and preferably between 1400° C. and 1500° C.) The sintering step is conducted for at least 1 hour (and preferably for between 2 hours and 3 hours.) Most preferably, the sintering step is done at about 1450° C. for about 2 hours. The sintering step is preferably done under positive silver vapor pressure, and most preferably the pressure is greater than 3 mm. Hg. The resulting product normally has a density between 3.7 and 3.94 grams per cc. Normally alumina is sintered at a temperature between 1700° C. and 1900° C. which means a tremendous loss in silver content. The use of the fluid energy mill as described in this invention allows the sintering to be conducted at a temperautre between 1400° C. and 1500° C. with a comparatively low loss in silver content. Another important factor in holding down the silver loss is the use of a positive silver vapor pressure.

The following examples will aid in explaining, but should not be deemed as limiting, the instant invention. In all cases, unless otherwise noted, all parts and percentages are by weight.

EXAMPLE 1

An alumina sol was prepared by dissolving 750 grams of $Al(NO_3)_3 \cdot 9H_2O$ in enough water to make a solution. A 10 percent NaOH was added dropwise while the solution was stirred. The pH of the solution was allowed to rise to 7 at which time a gel formed. The gel was transferred to centrifuge tubes and was centrifuged to sediment the precipitated solid particles. The supernatant was discarded. The precipitate was resuspended in 95 percent methanol and centrifuged. The supernatant was discarded. (Repetition of the process allows the further removal of the excess salts introduced in the course of precipitation.) The removal of salt was further continued by dialyzing the slurry. (The dialysis also converted the alcohol sol to a hydrosol.)

EXAMPLE 2

A silver sol was prepared by making an aqueous solution of 100 gm. of $AgNO_3$ and adding dilute (5 percent) ferric citrate solution to it dropwise under stirring. The precipitated silver was dialyzed.

EXAMPLE 3

The sols of Examples 1 and 2 were admixed in such proportions that the final hydrosol had a silver content of 4 percent.

EXAMPLE 4

Example 1 was repeated. Example 2 was repeated, except that the alumina hydrosol of Example 1 was added to the silver nitrate solution before the citrate solution was added. A hydrosol containing 4 percent silver was obtained.

EXAMPLE 5

Example 2 was repeated, except that 100 grams of alumina particles (less than $<0.1\mu$ particle size) was added (resuspended) to the silver nitrate solution (8 percent) before the citrate solution (5 percent) was added dropwise. The slurry was centrifuged and dialyzed as described in Example 1. A hydrosol containing 4 percent silver was obtained.

EXAMPLE 6

Example 2 was repeated, except that formaldehyde was used in place of the citrate solution.

EXAMPLE 7

The sols of Examples 1 and 6 were admixed in such proportions that the final hydrosol had a silver content of 4 percent.

EXAMPLE 8

Example 4 was repeated, except that formaldehyde was used in place of the citrate solution. A hydrosol containing 4 percent silver was obtained.

EXAMPLE 9

Example 5 was repeated, except that formaldehyde was used in place of the citrate solution. A hydrosol containing 4 percent silver was obtained.

EXAMPLE 10

Example 5 was repeated, except the alumina powder (particles) were calcined at 900° C. for 2 hours before being suspended (after cooling) in the silver nitrate solution. A hydrosol containing 4 percent silver was obtained.

EXAMPLE 11

The hydrosols of Examples 3, 4, 5, 7, 9 and 10 were each treated in an 8-inch diameter fluid energy mill operated at an outlet temperature of 800° F. and at a feed rate of 100 ml. per minute. The dried active products each had a mean particle size of 0.01 to 0.1 micron and water contents of less than 10 percent.

EXAMPLE 12

Each of the six dried products of Example 11 were then calcined at 900° C. for two hours and pressed at 50,000 p.s.i. into the shape of a pellet. Each pellet was sintered at 1450° C. under positive silver pressure (15–20 mm. Hg). The silver content of the sinterable powders ranged between 3.5 to 4.5 percent. The density of the sintered materials was between 3.7 and 3.9 gm./cc. The silver content of the sintered powders was 2 to 2.5 percent (X-ray fluorescence method).

EXAMPLES 13 AND 14

Example 12 was repeated twice, except that the sintering temperature was 1400° C. and 1500° C., respectively. Similar sintered materials were obtained.

EXAMPLE 15

Example 12 was repeated, except that the sintering was done without any positive silver pressure. Similar sintered materials were obtained.

EXAMPLE 16

Example 2 was repeated, except that the AgNo$_3$ solution was added to the citrate solution. A sol was prepared as in Example 1. The sol was dried in a fluid energy mill as in Example 11, and calcined and sintered as in Example 12. A sintered product was obtained.

EXAMPLE 17

Example 5 was repeated, except that the alumina particles were added to the citrate solution and then the silver nitrate was added dropwise. The sol was dried in a fluid energy mill as in Example 11, and calcined and sintered as in Example 12. A sintered product was obtained.

What is claimed is:
1. A process for preparing a silver-containing alumina composition which comprises:
   (a) providing an aluminum compound selected from the group consisting of an alumina hydrosol and alumina powder;
   (b) combining a solution containing a silver salt and a reducing agent with said aluminum compound whereby the salt is converted to metallic silver and it is deposited in and on the aluminum compound;
   (c) introducing the silver-containing aluminum compound into a fluid energy mill in contact with a high velocity fluid maintained at an elevated temperature and an elevated pressure wherein the silver-containing aluminum-compound is dried in powder form;
   (d) calcining said powder at a temperature between 800° C. and 1000° C. for about 1 to 3 hours; and
   (e) sintering the calcined product at a temperature between 1400° C. and 1500° C. for about 1 to 3 hours under a positive silver vapor pressure.
2. A process according to claim 1 wherein the aluminum compound is an alumina hydrosol.
3. A process according to claim 1 wherein the aluminum compound is calcined alumina powder.
4. A process according to claim 1 wherein the reducing agent is formaldehyde.
5. A process according to claim 1 wherein the reducing agent is ferric citrate.
6. A process according to claim 1 wherein step (b) is carried out by first adding the reducing agent to an alumina hydrosol and then adding the silver salt solution thereto.
7. A process according to claim 1 wherein an alumina hydrosol is first centrifuged and the resulting precipitate is dialyzed and then processed according to step (b).

References Cited

UNITED STATES PATENTS

| | | | |
|---|---|---|---|
| 1,935,177 | 11/1933 | Connolly et al. | 252—463 |
| 2,773,844 | 12/1956 | Carlson et al. | 252—463 |
| 2,894,898 | 7/1959 | Oettinger et al. | 252—463 |
| 2,901,441 | 8/1959 | Watterman | 252—463 |
| 2,932,620 | 4/1960 | Von Fuener et al. | 252—463 |
| 2,989,372 | 6/1961 | Gilbert | 252—463 |
| 3,150,443 | 9/1964 | Alexander et al. | 29—182.5 |
| 3,232,028 | 2/1966 | McDonald et al. | 252—463 |
| 3,411,878 | 11/1968 | Graulier et al. | 252—463 |
| 3,475,159 | 10/1969 | Hansen | 75—206 |
| 3,489,553 | 1/1970 | Duletsky | 75—206 |
| 3,185,301 | 5/1965 | Folkins et al. | 23—182 |

CARL D. QUARFORTH, Primary Examiner

B. H. HUNT, Assistant Examiner

U.S. Cl. X.R.

75—211, 212; 106—39 R, 65